(12) United States Patent
Kinomura et al.

(10) Patent No.: US 9,126,486 B2
(45) Date of Patent: Sep. 8, 2015

(54) POWER SUPPLY CONNECTOR, VEHICLE, AND METHOD FOR IDENTIFYING POWER SUPPLY CONNECTOR

(75) Inventors: Shigeki Kinomura, Suntou-gun (JP); Tomoya Ono, Toyota (JP); Shintaro Kosetsu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/702,469

(22) PCT Filed: Oct. 17, 2011

(86) PCT No.: PCT/JP2011/073798
§ 371 (c)(1),
(2), (4) Date: Dec. 6, 2012

(87) PCT Pub. No.: WO2013/057775
PCT Pub. Date: Apr. 25, 2013

(65) Prior Publication Data
US 2014/0217813 A1    Aug. 7, 2014

(51) Int. Cl.
*B60L 1/00* (2006.01)
*B60L 3/00* (2006.01)
*B60L 3/04* (2006.01)
*B60L 11/12* (2006.01)
(Continued)

(52) U.S. Cl.
CPC ............... *B60L 1/006* (2013.01); *B60L 3/0069* (2013.01); *B60L 3/04* (2013.01); *B60L 11/123* (2013.01); *B60L 11/14* (2013.01); *B60L 11/184* (2013.01); *B60L 11/1818* (2013.01); *B60L 11/1842* (2013.01); *B60L 11/1844* (2013.01); *B60L 11/1846* (2013.01); *B60L 2210/10* (2013.01); *B60L 2210/30* (2013.01); *B60L 2210/40* (2013.01); *H01R 31/065* (2013.01); *Y02E 60/721* (2013.01); *Y02T 10/6217* (2013.01); *Y02T 10/7005* (2013.01); *Y02T 10/7077* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
None
See application file for complete search history.

(56) References Cited

U.S. PATENT DOCUMENTS

| 2009/0102433 | A1* | 4/2009 | Kamaga | 320/165 |
| 2011/0074350 | A1* | 3/2011 | Kocher | 320/109 |

(Continued)

FOREIGN PATENT DOCUMENTS

| JP | A-2010-035277 | 2/2010 |
| JP | A-2011-015529 | 1/2011 |

(Continued)

OTHER PUBLICATIONS
U.S. Appl. No. 13/141,043, filed Jun. 20, 2011 in the name of Shinji Ichikawa.

*Primary Examiner* — Jared Fureman
*Assistant Examiner* — Aqeel Bukhari
(74) *Attorney, Agent, or Firm* — Oliff PLC

(57) ABSTRACT

A vehicle is provided with a connection signal line having electric potential is changed when a connector of a power charging cable is attached to a control pilot line through which a pilot signal CPLT is transmitted from the power charging cable. The charging connector is attached to a vehicle in place of the power charging cable. The power supply connector includes a first connection portion connected to the connection signal line and a second connection portion connected to the first connection portion and the control pilot line.

18 Claims, 16 Drawing Sheets

(51) Int. Cl.
　　*B60L 11/14*　　(2006.01)
　　*B60L 11/18*　　(2006.01)
　　*H01R 31/06*　　(2006.01)

(56) References Cited

U.S. PATENT DOCUMENTS

2011/0121779 A1　5/2011　Ichikawa et al.
2011/0139096 A1*　6/2011　Niimi ................................ 123/2

FOREIGN PATENT DOCUMENTS

| JP | B1-5123419 | 1/2013 |
| JP | A-2013-51772 | 3/2013 |
| JP | B2-5170482 | 3/2013 |
| WO | WO 2011/125214 A1 | 10/2011 |
| WO | WO 2013/030637 A2 | 3/2013 |
| WO | WO 2013/030646 A2 | 3/2013 |
| WO | WO 2013/030653 A2 | 3/2013 |

* cited by examiner

POWER SUPPLY CONNECTOR, VEHICLE, AND METHOD FOR IDENTIFYING POWER SUPPLY CONNECTOR

TECHNICAL FIELD

The present invention relates to a power supply connector, a vehicle, and a method for identifying a power supply connector, and more particularly to a technology for identifying that a power supply connector in place of a power charging cable is attached to a vehicle.

BACKGROUND ART

In recent years, as an environment-friendly vehicle, a vehicle mounted with a power storage device (for example, a secondary battery, a capacitor, and the like) and using a driving force generated by electric power stored in the power storage device for traveling attracts attention. Such a vehicle includes, for example, an electrically driven automobile, a hybrid automobile, a fuel cell vehicle, and the like. Further, a technology of using a commercial power supply achieving a high power generation efficiency to charge the power storage device provided in these vehicles has been proposed.

Similarly to an electrically driven automobile, there has been known a hybrid vehicle having an onboard power storage device capable of being charged (hereinafter, simply referred to as "external charging") using a power supply provided outside the vehicle (hereinafter, simply referred to as "external power supply"). For example, there has been known a vehicle which is so called "plug-in hybrid vehicle". The plug-in hybrid vehicle has a power storage device capable of being charged using a power supply of a general household by connecting a power outlet provided in a house and a charging slot provided in a vehicle through a power charging cable. Accordingly, fuel consumption efficiency of a hybrid automobile can be expected to be enhanced.

In such a vehicle capable of being externally charged, as can be seen in a smart grid, a concept of taking a vehicle as a power supply and supplying electric power from the vehicle to general electric equipment provided outside the vehicle is now under consideration. Further, in some cases, a vehicle is used as a power supply when using electric equipment during camping and working outside.

Japanese Patent Laying-Open No. 2010-035277 (PTL 1) discloses a vehicle having an onboard battery capable of being charged using a power charging cable, and particularly a power charge-discharge system capable of supplying electric power from a vehicle to electric load by using a power cable dedicated for supplying electric power, different from a power charging cable, connectable with a power supply outlet of electric load provided outside the vehicle.

CITATION LIST

Patent Literature

PTL 1: Japanese Patent Laying-Open No. 2010-035277

SUMMARY OF INVENTION

Technical Problem

In a system disclosed in Japanese Patent Laying-Open No. 2010-035277 (PTL 1), determination of a charging mode and a power supply mode is performed based on a pilot signal transmitted from a power cable.

However, to improve accuracy in determination, it is preferable that two or more determination systems are provided. On this point, in a system for determining the power charging mode and the power supply mode based only on a pilot signal, there was a room for improvement in enhancing the accuracy in determination.

Solution to Problem

In one embodiment, a power supply connector is to be attached to a vehicle provided with a connection signal line and a control pilot line. Through the connection signal line, voltage is modified when a connector of a power charging cable is attached. Through the control pilot line, a pilot signal is transmitted from the power charging cable. The power supply connector includes a first connection portion to be connected to the connection signal line and a second connection portion to be connected to the first connection portion and the control pilot line.

According to this configuration, the connection signal line and the control pilot line are connected. Accordingly, as an example, attachment of the power supply connector is determined based on whether or not a change pattern of electric potential of the connection signal line and a change pattern of electric potential of the control pilot line are the same. In other words, a dual determination system including the connection signal line and the control pilot line is used to determine whether or not the power supply connector is attached. Therefore, the possibility of erroneous determination on whether or not the power supply connector is attached can be lowered. Consequently, accuracy in determination on whether or not the power supply connector is attached can be improved.

In another embodiment, the power supply connector further includes a first switch provided between the first connection portion and the second connection portion, and a second switch provided between the first connection portion and ground.

According to this configuration, opening the first switch causes the control pilot line to be disconnected from the connection signal line, so that electric potential of the control pilot line and electric potential of the connection signal line can be differentiated. On the contrary, closing the first switch causes the control pilot line to be connected to the connection signal line, so that electric potential of the control pilot line and electric potential of the connection signal line can be set equal. On the other hand, closing the second switch causes the connection signal line to be connected to ground to lower the electric potential of the connection signal line. On the contrary, opening the second switch causes the connection signal line to be disconnected from the ground to increase the electric potential of the connection signal line. The electric potential of the connection signal line and the electric potential of the control pilot line can be changed using the first switch and the second switch.

In yet another embodiment, the first switch is opened when the second switch is closed, and closed when the second switch is opened.

According to this configuration, allowing the first switch and the second switch to be operated in conjunction can synchronize change in electric potential of the connection signal line and change in electric potential of the control pilot line when the connection signal line and control pilot line are proper. Thus, a vehicle can identify that the power supply connector is connected to the vehicle by detecting synchronization between the change in the electric potential of the connection signal line and the change in the electric potential of the control pilot line.

In yet another embodiment, the first switch is closed when the second switch is opened, and opened when the second switch is opened.

According to this configuration, allowing the first switch and the second switch to be operated in conjunction can synchronize the change in the electric potential of the connection signal line and the change in electric potential of the control pilot line when the connection signal line and the control pilot line are both proper. Thus, a vehicle can identify that the power supply connector is connected to a vehicle by detecting synchronization between the change in the electric potential of the connection signal line and the change in the electric potential of the control pilot line.

In yet another embodiment, the second switch is of a normally-closed type.

According to this configuration, when a user does not perform any operation, for example, the second switch is closed. Thus, when the power supply connector is connected to the vehicle, at least the electric potential of the connection signal line can be lowered. The vehicle can identify that a connector is connected to the vehicle by detecting the lowering of the electric potential of the connection signal line.

In yet another embodiment, the power supply connector further includes a third switch connected in series with the second switch between the first connection portion and the ground. The third switch is operated by a user when at least the power supply connector is to be detached from a vehicle.

According to this configuration, the third switch is provided in addition to the second switch. Accordingly, attachment of the power supply connector can be detected by operating the second switch different from the third switch operated for detecting the action of detaching the power supply connector by changing the electric potential of the connection signal line. Thus, when detecting attachment of the power supply connector, the operation with respect to the third switch for detaching the power supply connector can be avoided. Consequently, erroneous detachment of the power supply connector can be avoided.

In yet another embodiment, the power supply connector further includes a switch provided between the first connection portion and the second connection portion.

According to this configuration, opening the switch causes the control pilot line to be disconnected from the connection signal line, so that the electric potential of the control pilot line and the electric potential of the connection signal line can be differentiated. On the contrary, closing the switch causes the control pilot line to be connected to the control signal line, so that the electric potential of the control pilot line and the electric potential of the connection signal line can be set equal. The electric potential of the control pilot line can be changed using such a switch.

In yet another embodiment, the power supply connector further includes a switch provided between the first connection portion and the ground.

According to this configuration, closing the switch causes the connection signal line to be connected to ground, so that the electric potential of the connection signal line and the voltage of the control pilot line can be lowered. On the contrary, opening the switch causes the connection signal line to be disconnected from the ground, so that the electric potential of the connection signal line and the voltage of the control pilot line can be increased. The electric potential of the connection signal line and the electric potential of control pilot line can be changed using such a switch.

In yet another embodiment, a vehicle includes a connection signal line having voltage modified when a connector of a power charging cable is attached, a control pilot line through which a pilot signal is transmitted from a power charging cable, and an identifying device which identifies that the power supply connector is attached in accordance with a change pattern of electric potential of connection signal line and a change pattern of electric potential of the control pilot line.

According to this configuration, a determination system including the connection signal line and the control pilot line is used to enable determination on whether or not the power supply connector is attached. Therefore, the possibility of erroneous determination on whether or not the power supply connector is attached can be lowered. Consequently, accuracy in determination on whether or not the power supply connector is attached can be improved.

In yet another embodiment, the power supply connector includes a first connection portion to be connected to the connection signal line and a second connection portion to be connected to the first connection portion and the control pilot line. The vehicle further includes a changing device changing electric potential of the connection signal line.

According to this configuration, the electric potential of the connection signal line and the electric potential of the control pilot line can be synchronized and changed. Thus, when a change pattern of the electric potential of the connection signal line and a change pattern of the electric potential of the control pilot line are the same, attachment of the power supply connector can be identified.

In yet another embodiment, the changing device changes the electric potential of the connection signal line in a predetermined pattern.

According to this configuration, when the electric potential of the connection signal line and the electric potential of the control pilot line are synchronized and changed in a predetermined pattern, attachment of the power supply connector can be identified.

In yet another embodiment, the power supply connector is to be attached to a vehicle provided with a connection signal line having a voltage changed when a connector of a power charging cable is attached, and a control pilot line through which a pilot signal is transmitted from a power charging cable. A method for identifying a power supply connector includes the steps of detecting a change pattern of electric potential of the connection signal line, detecting a change pattern of an electric potential of the control pilot line, and identifying that the power supply connector is attached based on a change pattern of the electric potential of the connection signal line and a change pattern of the electric potential of the control pilot line.

According to this configuration, a dual determination system including the connection signal line and the control pilot line is used to determine whether or not the power supply connector is attached. Therefore, the possibility of erroneous determination on whether or not the power supply connector is attached can be lowered. Consequently, accuracy in determination on whether or not the power supply connector is attached can be improved.

Advantageous Effects of Invention

As a determination system for determining whether or not a power supply connector is connected, a dual determination system including a connection signal line and a control pilot line are used. Therefore, the possibility of erroneous determination on whether or not the power supply connector is attached can be lowered. Consequently, accuracy in determination on whether or not the power supply connector is connected can be improved.

DESCRIPTION OF EMBODIMENTS

Figure 1:
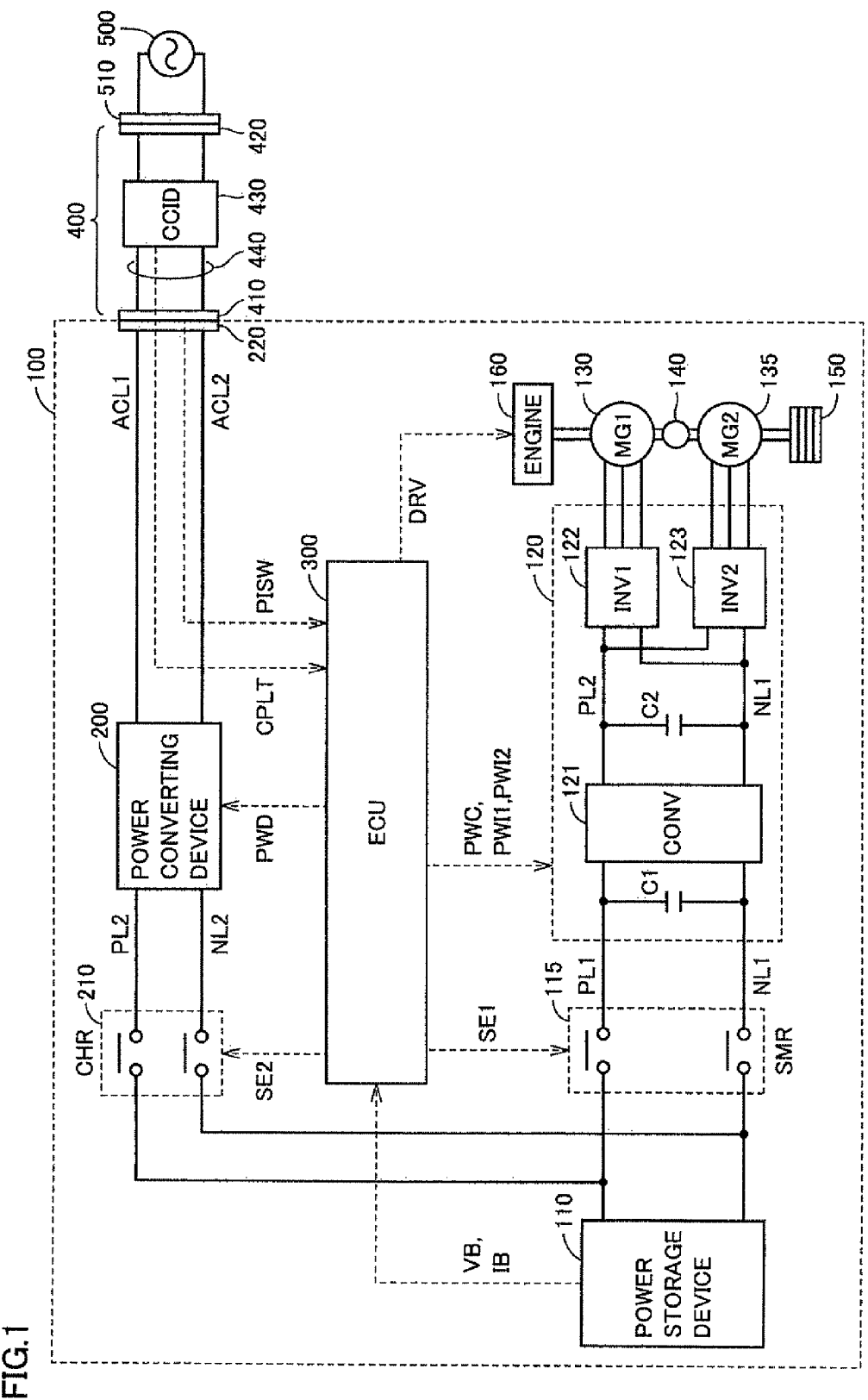
FIG. 1 is a block diagram representing an entire vehicle.

In the following, embodiments of the present invention will be described in detail with reference to the drawings. The same or corresponding parts in the drawings have the same reference numerals allotted, and description thereof will not be repeated.

Description on a Vehicle and a Power Charging Cable

FIG. 1 represents a block diagram of an entire hybrid vehicle 100 according to the present embodiment. Referring to FIG. 1, vehicle 100 includes a power storage device 110, a system main relay (SMR) 115, a PCU (Power Control Unit) 120, motor generators 130, 135, a power transmission gear 140, a drive wheel 150, an engine 160, and an ECU (Electronic Control Unit) 300 as a control device. PCU 120 includes a converter 121, inverters 122, 123, and capacitors C1, C2.

Power storage device 110 is a power storage element configured to be chargeable and dischargeable. For example, power storage device 110 is configured to include a secondary battery such as a lithium-ion battery, a nickel-metal hydride battery, or a lead battery, or a power storage element such as an electric double layer capacitor.

Power storage device 110 is connected to PCU 120 through an electric power line PL1 and a ground line NL1. Power storage device 110 supplies PCU 120 with electric power for generating the driving force for a vehicle 100. Further, power storage device 110 stores the electric power generated by motor generators 130, 135. Output of power storage device 110 is, for example, about 200V.

Power storage device 110 includes a voltage sensor and a current sensor, neither illustrated, and applies a voltage VB and a current IB of power storage device 110 to ECU 300.

One of relays included in an SMR 115 is connected to power line PL1 connected to a positive terminal of power storage device 110 and PCU 120, and the other one of relays is connected to a negative terminal of power storage device 110 and ground line NL1. SMR 115 switches supply and interruption of electric power between power storage device 110 and PCU 120 based on a control signal SE1 applied from ECU 300.

Converter 121 performs voltage conversion between power line PL1 and ground line NL1 and between the power line PL2 and ground line NL1 based on a control signal PWC applied from ECU 300.

Inverters 122, 123 are connected in parallel to power line PL2 and ground line NL1. Inverters 122, 123 convert the direct current power supplied from converter 121 into alternate current power based on control signal PWI1, PWI2 applied from ECU 300 to drive motor generators 130, 135.

Capacitor C1 is provided between power line PL1 and ground line NL1 to reduce voltage variation between power line PL1 and ground line NL1. Further, capacitor C2 is provided between power line PL2 and ground line NL1 to reduce voltage variation between power line PL2 and ground line NL1.

Motor generators 130, 135 are alternate current rotating electrical machines, particularly are permanent magnet type synchronous electric motors provided with a rotor having a permanent magnet embedded.

Output torque of motor generators 130, 135 is transmitted to drive wheels 150 through power transmission gear 140 configured to include a reducer and a power split mechanism to allow vehicle 100 to move. Motor generators 130, 135 can generate electric power using the rotational force of drive wheel 150 at the time of regenerative braking operation of vehicle 100. Then, PCU 120 converts the generated electric power into charging electric power for power storage device 110.

Further, motor generators 130, 135 are connected also to engine 160 through power transmission gear 140. Then, ECU 300 causes motor generators 130, 135 and engine 160 to operate cooperatively to generate the required vehicle driving force. Further, motor generators 130, 135 can generate electric power through the rotation of engine 160 and uses the generated electric power to charge power storage device 110. In the present embodiment, motor generator 135 is used exclusively as an electric motor for driving drive wheels 150, and motor generator 130 is used exclusively as a power generator driven by engine 160.

In FIG. 1, the configuration of providing two motor generators is shown as an example, but the number of motor generators is not limited to this configuration. One or more than two motor generators may be provided. Further, vehicle 100 may be an electrically-driven automobile provided with no engine, or may be a fuel cell vehicle.

As a configuration for charging power storage device 110 by electric power supplied from external power supply 500, vehicle 100 includes a power converting device 200, a charging relay CHR 210, and an inlet 220 as a connection portion.

A charging connector 410 of a power charging cable 400 is connected to inlet 220. Then, electric power from external power supply 500 is transmitted to vehicle 100 through power charging cable 400.

In addition to charging connector 410, power charging cable 400 includes a plug 420 for connection to an outlet 510 of external power supply 500 and an electric power line 440 for connection with charging connector 410 and plug 420. A charging circuit interrupt device (hereinafter, referred to as CCID) 430 for switching supply and interruption of electric power from external power supply 500 is inserted to power line 440.

Power converting device 200 is connected to inlet 220 through power lines ACL1, ACL2. Further, power converting device 200 is connected to power storage device 110 by power line PL2 and ground line NL2 through CHR 210.

Power converting device 200 is controlled by a control signal PWD from ECU 300 and converts alternate current power supplied from inlet 220 into charging electric power for power storage device 110. Further, as will be described later, power converting device 200 converts direct current power supplied from power storage device 110 or direct current power generated by motor generators 130, 135 and converted by PCU 120 into alternate current power and supplies the electric power outside of the vehicle. Power converting device 200 may be a single device capable of converting electric power in bidirectional manner between charging and supplying or may include a device for charging and a device for supplying separately.

CHR 210 is controlled by a control signal SE2 applied from ECU 300 and switches supply and interruption of electric power between power converting device 200 and power storage device 110.

ECU 300 includes a CPU (Central Processing Unit), a storage device, and an input-output buffer, none of which are illustrated in FIG. 1, applies input of signal from each sensor and output of control signal to each equipment and performs control with respect to power storage device 110 and each equipment in vehicle 100. These controls are not limited to the process executed by software, and can be executed by hardware (electronic circuit) for exclusive use.

ECU 300 calculates the state of charge (SOC) of power storage device 110 based on a detection value of voltage VB and current IB from power storage device 110.

ECU 300 receives a signal PISW indicating a connection state of power charging cable 400 from charging connector 410. Further, ECU 300 receives a pilot signal CPLT from CCID 430 of power charging cable 400. As will be described later with reference to FIG. 2, ECU 300 executes charging operation based on these signals.

In FIG. 1, the configuration of providing one control device as ECU 300 is shown. However, the configuration may be of separately providing control devices for each function and an equipment to be controlled, such as a control device for PCU 120 and a control device for power storage device 110, for example.

Figure 2:
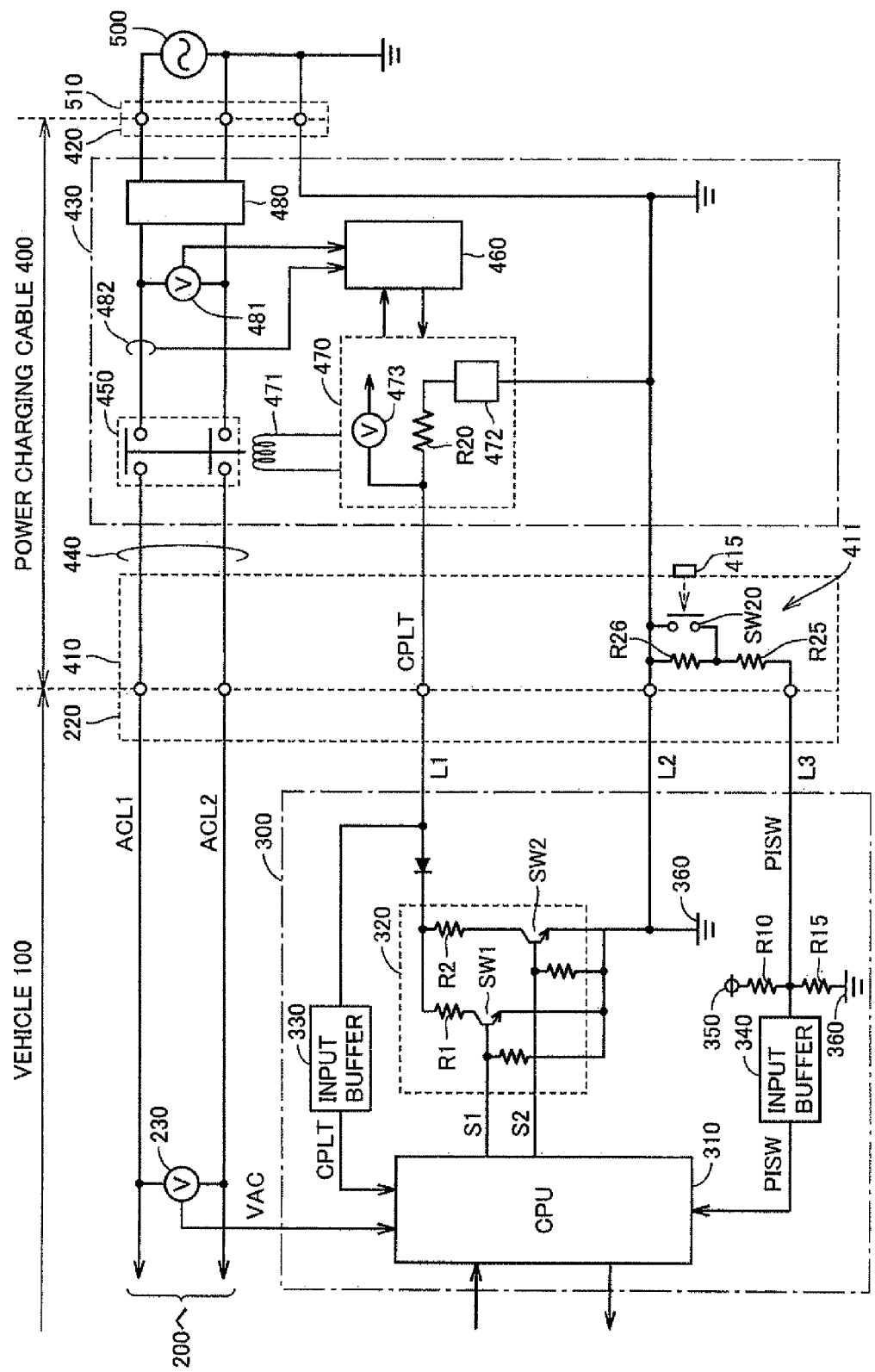
FIG. 2 is a block diagram for explaining a power charging cable.

FIG. 2 is a block diagram for describing charging operation in FIG. 1. In FIG. 2, description about the elements having the same reference numerals allotted as in FIG. 1 will not be repeated.

Referring to FIG. 2, CCID 430 includes a CCID relay 450, a CCID controller 460, a control pilot circuit 470, an electromagnetic coil 471, an electrical leakage detector 480, a voltage sensor 481, and a current sensor 482. Control pilot circuit 470 includes an oscillation circuit 472, a resistor R20, and a voltage sensor 473.

CCID relay 450 is inserted into power line 440 in power charging cable 400. CCID relay 450 is controlled by control pilot circuit 470. When CCID relay 450 is opened, an electric path is interrupted in power charging cable 400. On the other hand, when CCID relay 450 is closed, electric power is supplied from external power supply 500 to vehicle 100.

Control pilot circuit 470 applies pilot signal CPLT to ECU 300 through charging connector 410 and inlet 220. This pilot signal CPLT functions to notify a rated current of power charging cable 400 from control pilot circuit 470 to ECU 300. Further, pilot signal CPLT is used to allow ECU 300 to remotely control CCID relay 450 based on electric potential of pilot signal CPLT controlled by ECU 300. Then, control pilot circuit 470 controls CCID relay 450 based on a change in electric potential of pilot signal CPLT.

Pilot signal CPLT and connection signal PISW described above, and the configuration such as the shapes and terminal arrangements of inlet 220 and charging connector 410 are standardized by Society of Automotive Engineers (SAE) in USA and International Electrotechnical Commission (IEC).

CCID controller 460 includes a CPU, a storage device, and an input-output buffer, none of which are not illustrated, to input and output signals of each sensor and control pilot circuit 470 and control charging operation of power charging cable 400.

Oscillation circuit 472 outputs non-oscillated signal when the electric potential of pilot signal CPLT detected by voltage sensor 473 is at a prescribed electric potential level (for example, 12V). When the electric potential of pilot signal CPLT is lowered from the prescribed electric potential (for example, 9V), oscillation circuit 472t is controlled by CCID controller 460 to output a signal oscillating at a predetermined frequency (for example 1 kHz) and duty cycle.

The electric potential of the pilot signal CPLT is controlled by ECU 300. Further, the duty cycle is set based on the rated current that can be supplied to vehicle 100 from external power supply 500 through power charging cable 400.

Pilot signal CPLT oscillates at a prescribed cycle when the electric potential of the pilot signal CPLT is lowered from the prescribed electric potential as described above. Here, a pulse width of pilot signal CPLT is set based on the rated current that can be supplied from external power supply 500 to vehicle 100 through power charging cable 400. In other words, with the duty indicated by a ratio of a pulse width with respect to the oscillation cycle, the rated current is notified from control pilot circuit 470 to ECU 300 of vehicle 100 using pilot signal CPLT.

Further, the rated current is set for each power charging cable, and the rated current differs when the type of power charging cable 400 is different. Thus, the duty of pilot signal CPLT becomes different for each power charging cable 400.

ECU 300 can detect the rated current that can be supplied to vehicle 100 through power charging cable 400 based on the duty of pilot signal CPLT received through control pilot line L1.

When the electric potential of pilot signal CPLT is lowered further by ECU 300 (for example, 6V), control pilot circuit 470 supplies current to electromagnetic coil 471. Electromagnetic coil 471 generates electromagnetic force when current is supplied from control pilot circuit 470 and closes the connection point of CCID relay 450 to obtain the conduction state.

The electric leakage detector 480 is provided in the course of power line 440 of power charging cable 400 of in CCID 430 to detect presence of electric leakage. Specifically, electric leakage detector 480 detects an equilibrium state of electric current flowing in opposite direction from power line 440 of a pair and detects generation of electrical leakage when the equilibrium state fails. Although not particularly illustrated, when electrical leakage is detected by electrical leakage detector 480, the supply of power to electromagnetic coil 471 is interrupted, and the connection point of CCID relay 450 is opened, so that a non-conduction state is obtained.

When plug 420 of power charging cable 400 is inserted into outlet 510, voltage sensor 481 detects the power supply voltage transmitted from an external power supply 500 and notifies the detection value to CCID controller 460. Further, current sensor 482 detects charging current flowing through power line 440 and notifies the detection value to CCID controller 460.

Charging connector 410 includes a connection sensing circuit 411 having resistors R25, R26 and a switch SW20. Resistors R25, R26 are connected in series between connection signal line L3 and ground line L2. Switch SW20 is connected in parallel with resistor R26.

Switch SW20 is, for example, a limit switch, and the connection point is closed in a state where charging connector 410 is securely fitted in inlet 220. In the state where charging connector 410 is separated from inlet 220, and in the case where the fitting state between charging connector 410 and inlet 220 is not secured, the connection point of switch SW20 is opened. Further, when switch SW20 is provided in charging connector 410, and charging connector 410 is detached from inlet 220, the connection point is opened by an operation performed by a user with respect to operating portion 415.

In the state where charging connector 410 is separated from inlet 220, the voltage signal determined by the voltage of power supply node 350 included in ECU 300, a pull-up resistor R10, and a resistor R15 is generated as connection signal PISW in connection signal line L3. Further, in the state where charging connection 410 is connected to inlet 220, in correspondence with the fitting state and the operation state with respect to operating portion 415, a voltage signal corresponding to synthetic resistance by the combination of resistors R10, R15, R25, and R26 is generated in connection signal line L3. In other words, when charging connector 410 of power charging cable 400 is attached to inlet 220, the electric potential of connection signal line L3 is changed.

ECU 300 detects the electric potential of connection signal line L3 (in other words, the electric potential of connection signal PISW) to determine the connection state and fitting state of charging connector 410.

In vehicle 100, ECU 300 includes a CPU 310, a resistance circuit 320, and input buffers 330, 340 in addition to power supply node 350, pull-up resistor R10, and resistor R15.

Resistance circuit 320 includes pull-down resistors R1, R2, and switches SW1, SW2. Pull-down resistor R1 and switch SW1 are connected in series between the connection pilot line L1 where the pilot signal CPLT is communicated and ground line (vehicle earth) 360. Pull-down resistor R2 and switch SW2 are also connected between connection pilot line L1 and vehicle earth 360 in series. Then, switches SW1, SW2 are controlled to conduction or non-conduction in accordance with control signals S1, S2 from CPU 310, respectively.

The resistance circuit 320 is circuit for operating the electric potential of pilot signal CPLT from the side of vehicle 100.

Input buffer 330 receives pilot signal CPLT of control pilot line L1 and applies the received pilot signal CPLT to CPU 310. Input buffer 340 receives connection signal PISW from connection signal line L3 connected to connection sensing circuit 411 of charging connector 410, and outputs the connection signal PISW to CPU 310. Voltage is applied from ECU 300 to connection signal line L3 as described above, and the connection of charging connector 410 to inlet 220 changes the electric potential of connection signal PISW. CPU 310 detects the electric potential of the connection signal PISW to detect the connection state and the fitting state of charging connector 410.

CPU 310 receives pilot signal CPLT and connection signal PISW from input buffers 330 and 340, respectively. CPU 310 detects the electric potential of connection signal PISW to senses the connection state and the fitting state of charging connector 410. Further, CPU 310 detects the oscillation state and the duty cycle of pilot signal CPLT to detect the rated current of power charging cable 400.

Then, CPU 310 controls the control signals S1, S2 of switches SW1, SW2 based on the electric potential of connection signal PISW and the oscillation state of pilot signal CPLT to control the electric potential of pilot signal CPLT. Accordingly, CPU 310 can remotely control CCID relay 450. Then, transmission of electric power from external power supply 500 to vehicle 100 is performed through power charging cable 400.

CPU 310 is applied with voltage VAC detected by voltage sensor 230 provided between power cables ACL1 and ACL2 and supplied from external power supply 500.

Referring to FIG. 1 and FIG. 2, when the connection point of CCID relay 450 is closed, alternate current power is supplied from external power supply 500 to power converting device 200, so that preparation for charging from external power supply 500 to power storage device 110 is completed. CPU 310 outputs control signal PWD to power converting device 200 to convert the alternate current power from external power supply to direct current power capable of charging power storage device 110. Then, CPU 310 closes the connection point of CHR 210 by applying control signal SE2, to perform the charging with respect to power storage device 110.

First Embodiment

In such a vehicle capable of being externally charged as described above, as can be seen in a smart grid, a concept of taking a vehicle as a power supply and supplying electric power from the vehicle to general electric equipment provided outside the vehicle is now under consideration. Further, in some cases, a vehicle is used as a power supply when using electronic equipment during camping and working outside.

In the present embodiment, the electric power stored in power storage device 110 or the electric power generated by driving of engine 160 is supplied to electric equipment 700 through power supply connector 600.

Figure 3:
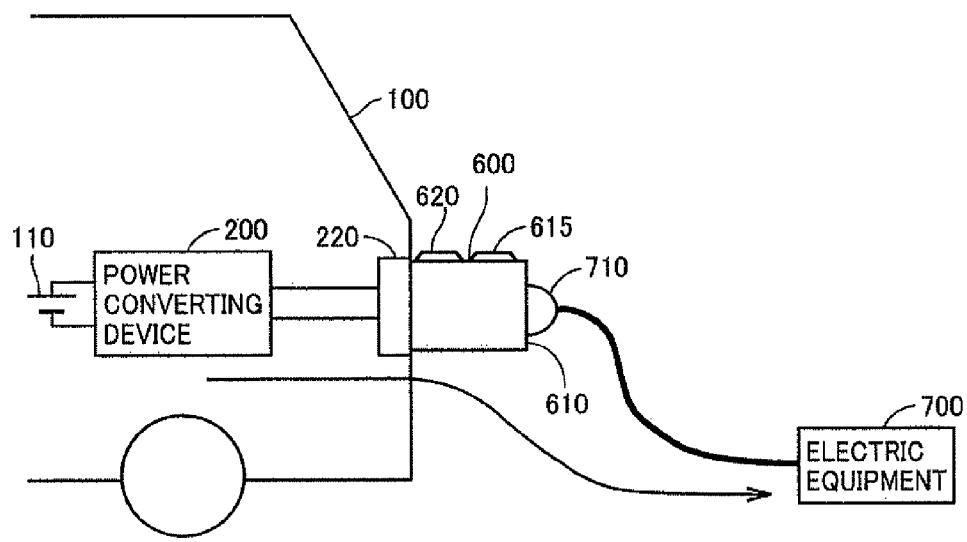
FIG. 3 represents a state of attaching a power supply connector in place of a power charging cable to an inlet.

Referring to FIG. 3, power supply connector 600 includes a terminal portion having a shape which is similar to the shape of the terminal of charging connector 410 for power charging cable 400 described with reference to FIG. 1, and can be connected to inlet 220 of vehicle 100 in place of power charging cable 400.

Figure 4:
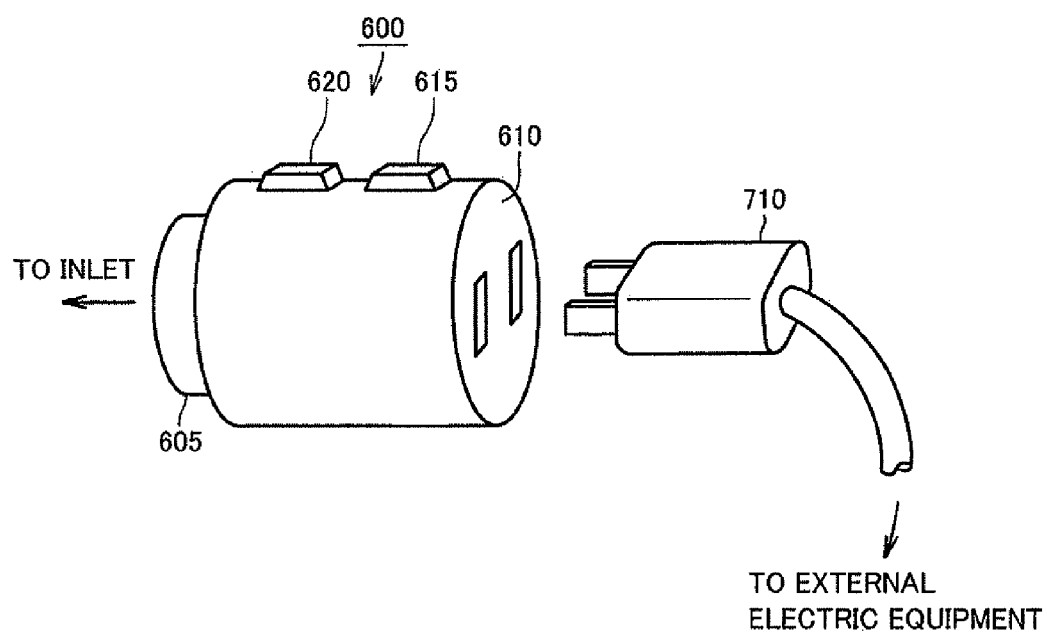
FIG. 4 schematically represents the power supply connector.

As shown in the schematic diagram of FIG. 4, power supply connector 600 is provided with a fitting portion 605, an operating portion 615, and an operating portion 620. Fitting portion 605 has a shape corresponding to inlet 220 so as to fit into inlet 220. Further, by pressing operating portion 615, the fitting state with respect to inlet 220 is released. Operating portion 620 will be described later.

Power supply connector 600 is provided with an output portion 610 capable of being connected with power supply plug 710 of external electric equipment 700. Output portion 610 may be configured as a separate body from power supply connector 600, and output portion 610 and power supply connector 600 may be connected through a cable.

When power supply connector 600 is connected to inlet 220, power supply operation is performed in vehicle 100, and then power from vehicle 100 is supplied to electric equipment 700 through inlet 220 and power supply connector 600.

Figure 5:
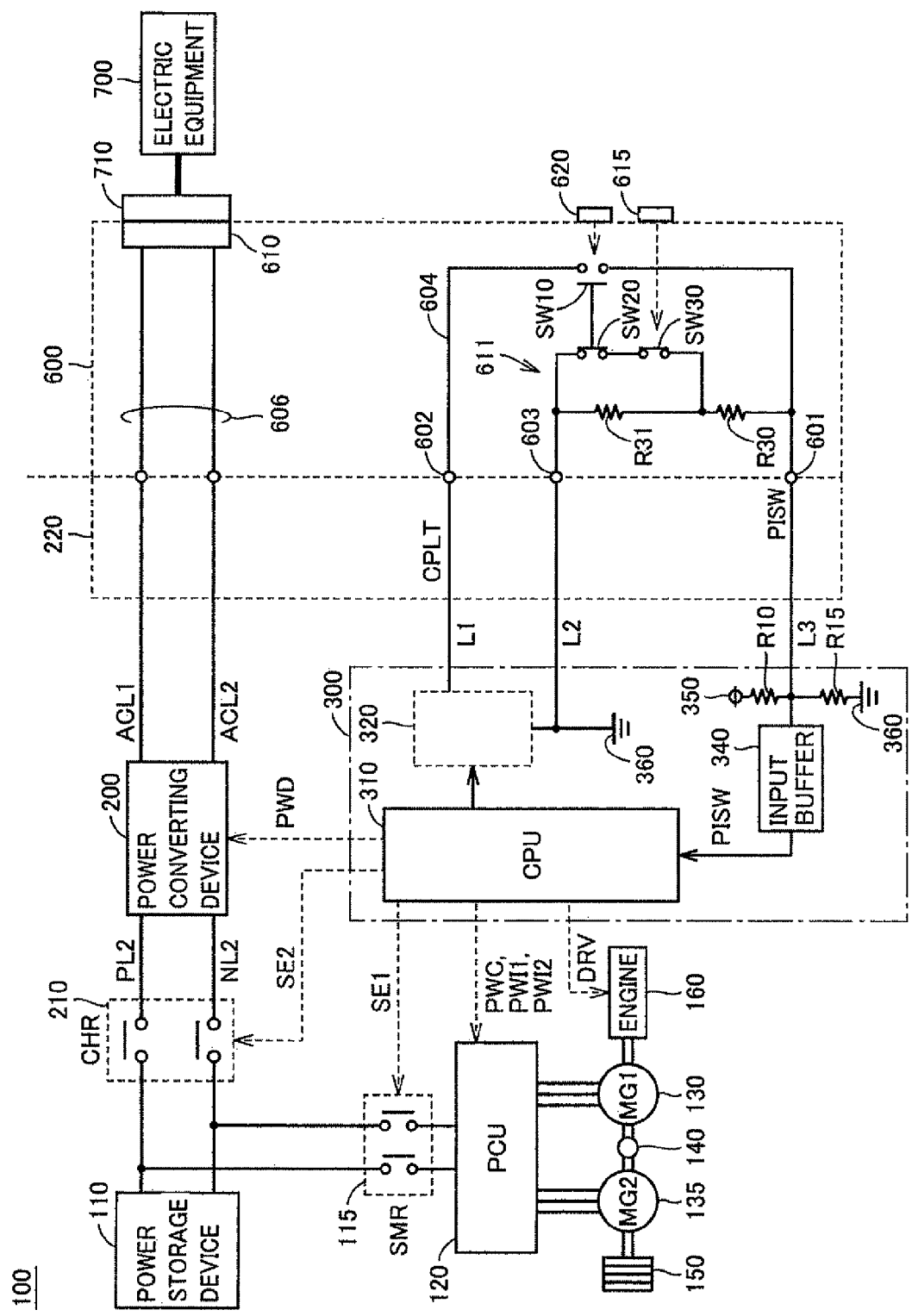
FIG. 5 is a block diagram for describing a power supply connector according to the first embodiment.

FIG. 5 is a block diagram for explaining the power supply operation in the case of using the power supply connector of FIG. 4. In FIG. 5, description of the elements having the same reference numerals allotted redundantly as FIGS. 1 and 2 will not be repeated.

Referring to FIG. 5, when power supply connector 600 is connected to inlet 220, power lines ACL1, ACL2 on the side of vehicle 100 and output portion 610 are electrically connected through power transmitting portion 606.

Power supply connector 600 includes a first connection portion 601 connected to connection signal line L3, a second connection portion 602 connected to first connection portion 601 and control pilot line L1, a third connection portion 603 connected to ground line L2, and a connection circuit 604.

First connection portion 601 is electrically connected to connection signal line L3 when power supply connector 600 is attached to inlet 220. Second connection portion 602 is electrically connected to control pilot line L1 when power supply connector 600 is attached to inlet 220. Third connection portion 603 is electrically connected to ground line L2 when power supply connector 600 is attached to inlet 220.

Connection circuit 604 connects first connection portion 601 and second connection portion 602. Thus, connection circuit 604 connects connection signal line L3 and control pilot line L1 when power supply connector 600 is attached to inlet 220.

Power supply connector 600 further includes resistors R30, R31 and switch SW30. When power supply connector 600 is connected to inlet 220, resistors R30, R31 are connected in series between connection signal line L3 and ground line L2.

Switch SW30 is connected in parallel with resistor R31. Switch SW30 is closed at the connection point in the state where power supply connector 600 is securely fitted into inlet 220. In other words, switch SW30 is of a normally-closed type. Switch SW30 may be of a normally-opened type. In a state where power supply connector 600 is separated from inlet 220, and in the case where the fitting state between power supply connector 600 and inlet 220 is not secured, the connection point of switch SW30 is opened. Further, switch SW30 is opened at the connection point also by an operation to operating portion 615. Thus, the state of switch SW30 is changed when power supply connector 600 is attached to vehicle 100, and when power supply connector 600 is detached from vehicle 100.

When power supply connector 600 is connected to inlet 220, CPU 310 determines the connection state and the fitting state of power supply connector 600 in accordance with synthetic resistance set by the combination of resistors R10, R15, R30, R31.

Power supply connector 600 further includes SW10 and switch SW20 in addition to switch SW30. Switch SW10 is provided between first connection portion 601 and second connection portion 602 on connection circuit 604. Switch SW10 is of a normally-opened type. Switch SW10 may be of a normally-closed type.

Switch SW20 is provided between first connection portion 601 and ground (vehicle earth) 360. More specifically, switch SW20 is connected in series with switch SW30 between first connection portion 601 and ground earth 360. In the present embodiment, switch SW20 is of a normally-closed type. Switch SW20 may be of a normally-opened type, but it is preferable that switch SW20 is of a normally-closed type.

Switch SW10 and switch SW20 operate in conjunction when operating portion 620 is operated. When operation portion 620 is operated by a user, switch SW10 is closed and switch SW20 is opened. When operating portion 620 is not operated, switch SW10 is opened, and switch SW20 is closed.

Alternatively, the switches may be set such that switch SW10 is opened, and switch SW20 is opened when operating portion 620 is operated by a user. In other words, switch SW10 may be closed, and switch SW20 may be closed, when operating portion 620 is not operated. Switch SW10 and switch SW20 are provided so as to change the electric potential of connection signal line L3 and the electric potential of control pilot line L1.

Figure 6:
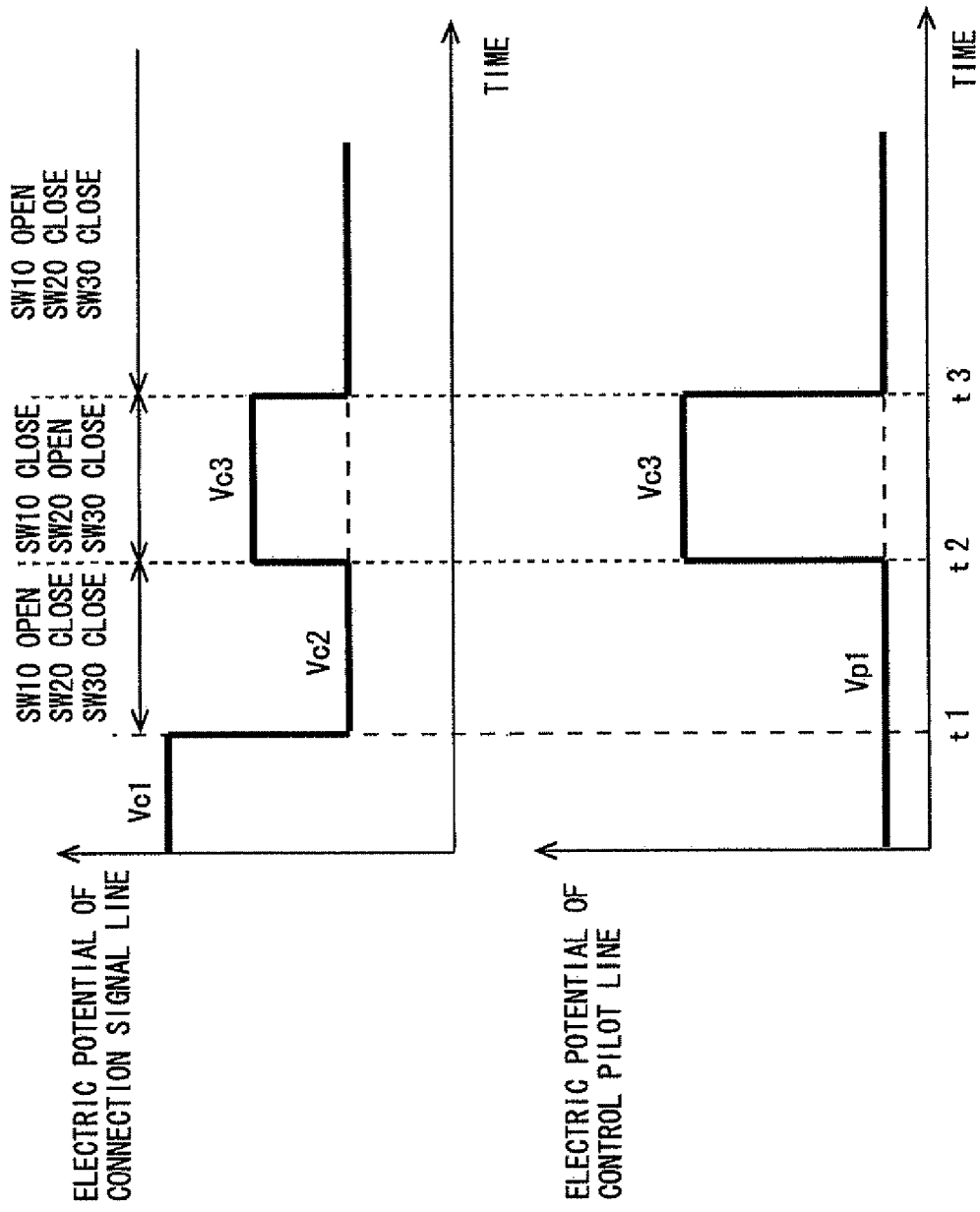
FIG. 6 represents a change pattern of electric potential.

FIG. 6 shows the electric potential of connection signal line L3 and the electric potential of control pilot line L1. Before a time t1 where charging connector 410 and power supply connector 600 are not connected to inlet 220, the electric potential of connection signal line L3 is an electric potential Vc1 determined by resistor R10 and resistor R15. Since control pilot line L1 is not connected to any of the power supplies, the electric potential of control pilot line L1 is a predetermined potential Vp1 (for example, Vp1=0).

After power supply connector 600 is connected to inlet 220 at time t1, the electric potential of connection signal line L3 is lowered to the electric potential Vc2 determined by resistor R10, resistor R15, and resistor R30 when operating portion 620 is not operated. Since switch SW10 is open when operating portion 620 is not operated, control pilot line L1 remains at the level of predetermined electric potential Vp1.

When a user operates operating portion 620 at time t2 to open switch SW20 and close switch SW10, the electric potential of connection signal line L3 increases to electric potential Vc3 determined by resistor R31 in addition to resistor R10, resistor R15, and resistor R30. Since the control pilot line L1 is connected to connection signal line L3, control pilot line L1 has the electric potential increased to electric potential Vc3 which is the same as the electric potential of connection signal line L3.

After that, when a user lifts his finger from the operating portion 620 to close switch SW20 at time t3, and open switch SW10, the electric potential of connection signal line L3 is lowered to the electric potential Vc2, and the electric potential of control pilot line L1 is lowered to electric potential Vp1.

CPU 310 identifies that power supply connector 600 is attached in accordance with such a change pattern of electric potential of connection signal line L3 and a change pattern of electric potential of control pilot line L1. More specifically, when the electric potential of connection signal line L3 and the electric potential of control pilot line L1 synchronize to increase, and thereafter synchronizes to be lowered, CPU 310 identifies that power supply connector 600 is attached. The change pattern of electric potential for identifying attachment of power supply connector 600 is not limited to this. The attachment of power supply connector 600 may be identified when the change pattern of electric potential which can be obtained by operation of a user for a plurality of times (for example, twice, or combination of three times and seven times) with respect to operating portion 620 with the predetermined pattern.

Referring back to FIG. 5, when CPU 310 identifies that power supply connector 600 is connected, it closes CHR 210 and controls power converting device 200 to perform power supply operation, to supply power from power storage device 100 to external electric equipment 700.

Further, when SOC of power storage device 100 is lowered, or when an instruction is given by a user, CPU 310 drives engine 160 to perform generation of power by motor generator 130, and supplies the generated power to electric equipment 700.

Figure 7:
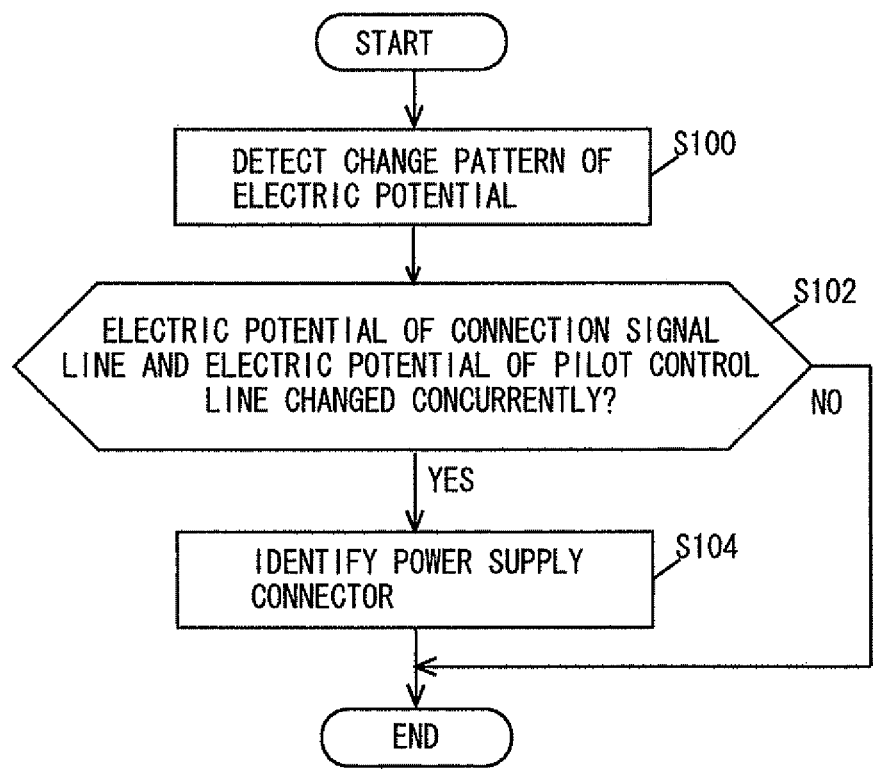
FIG. 7 represents a flowchart of a process executed by an ECU in the first embodiment.

Referring to FIG. 7, the process to be executed by ECU 300 to identify that power supply connector 600 is attached to inlet 220 will be described. The process which will be described hereinafter is realized by execution of the program stored in advance in CPU 310 in a predetermined cycle. In some of steps, hardware (electronic circuit) for exclusive use may be provided to execute the process.

In step (in the following, the step will be abbreviated as S) 100, the change pattern of electric potential of connection signal line L3 and the change pattern of electric potential of control pilot line L1 are detected. In accordance with the change pattern of the electric potential of connection signal line L3 and the change pattern of electric potential of control pilot line L1, attachment of power supply connector 600 is identified.

By way of one example, when the electric potential of connection signal line L3 and the electric potential of control pilot line L1 increased concurrently, and thereafter lowered concurrently (YES in S102), attachment of power supply connector 600 is identified in S104.

Figure 8:
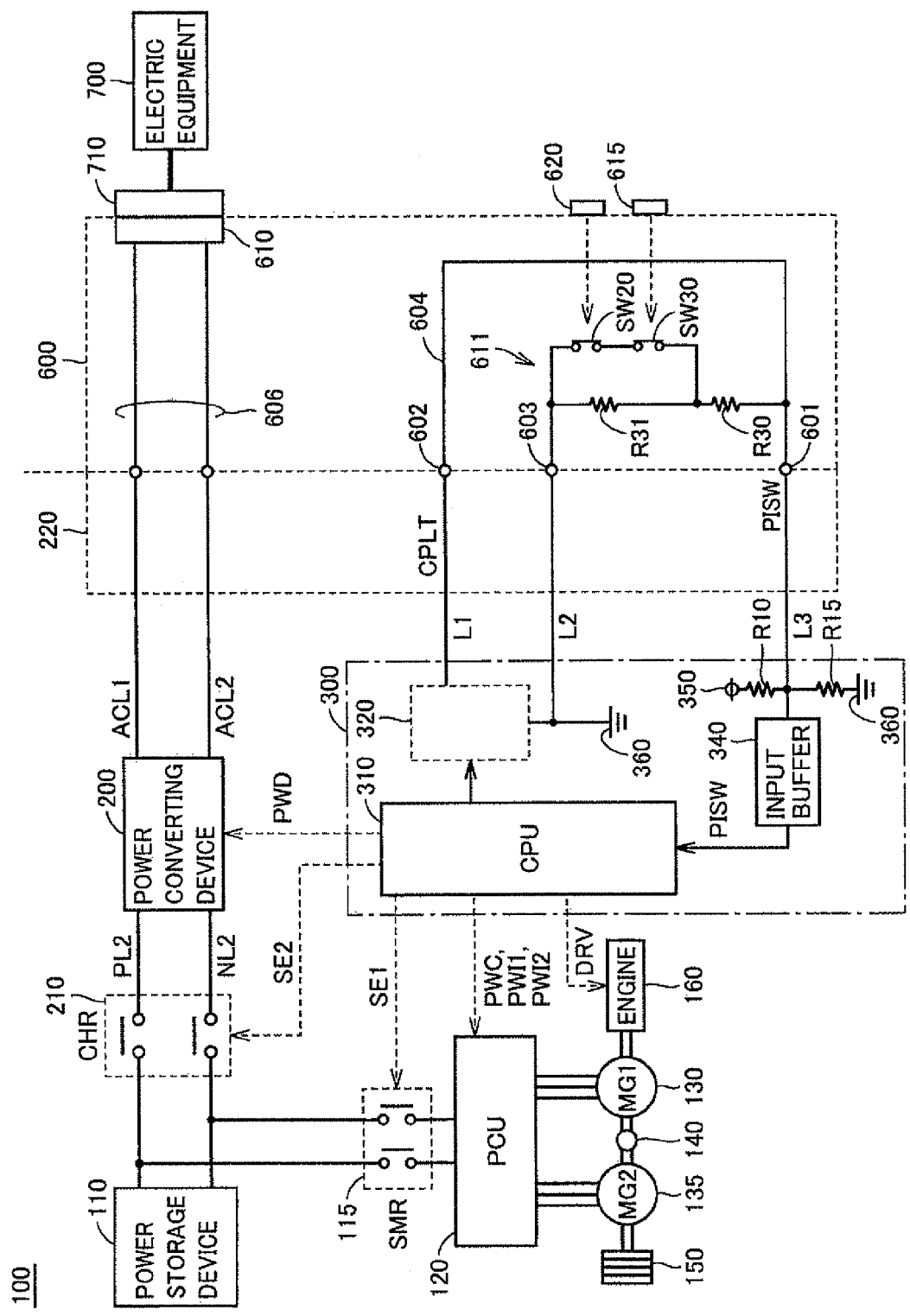
FIG. 8 represents a (first) modified example of a power supply connector shown in FIG. 5.

In the embodiment described above, switch SW10 is provided in addition to switch SW20. However, as long as CPU 310 can detect the electric potential of control pilot line L1 with high accuracy, only switch SW20 may be provided without providing switch SW10, as shown in FIG. 8.

Figure 9:
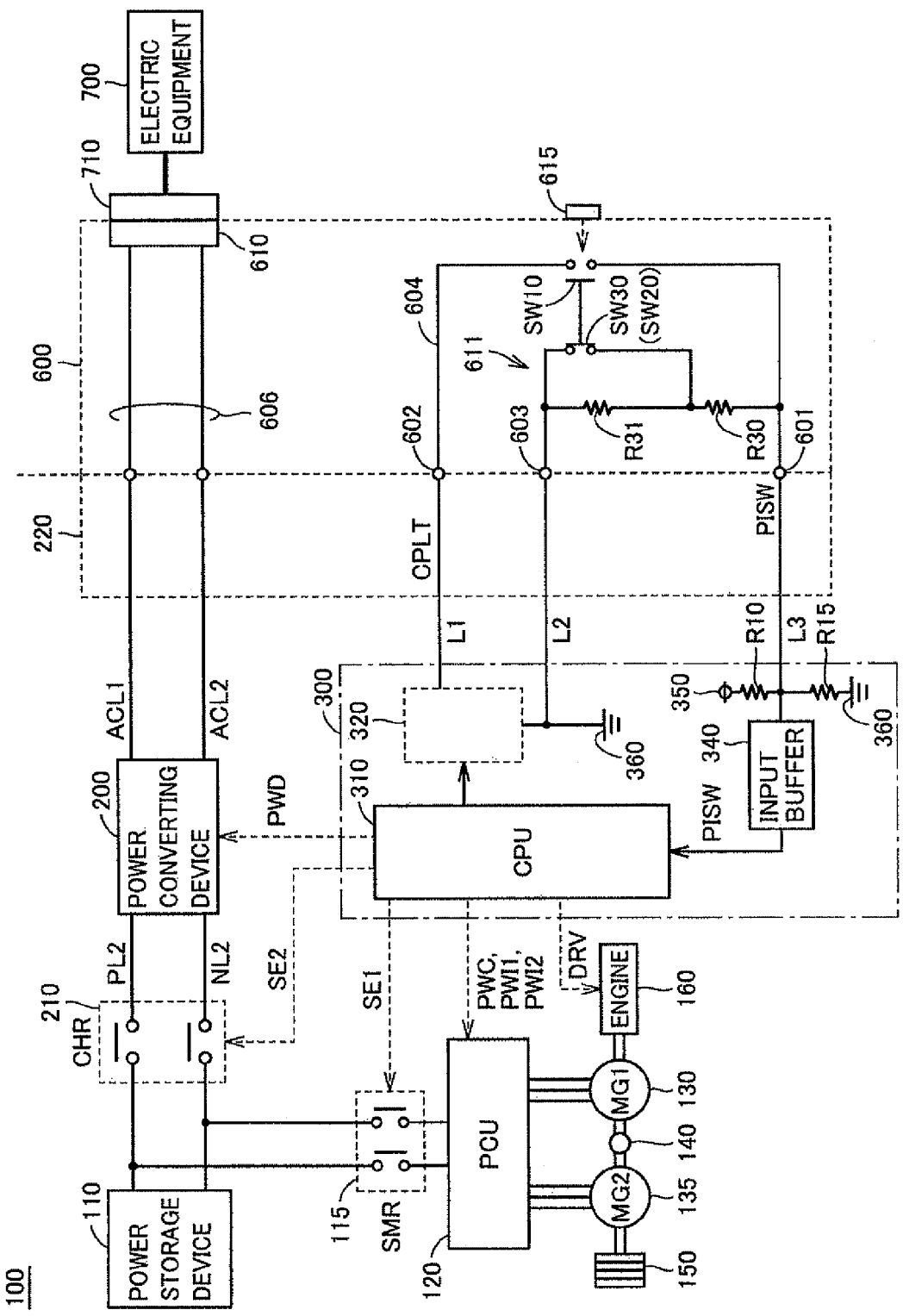
FIG. 9 represents a (second) modified example of the power supply connector shown in FIG. 5.

Further, instead of providing switch SW20 and switch SW30 separately, switch SW30 may be used as switch SW20, as shown in FIG. 9.

Figure 10:
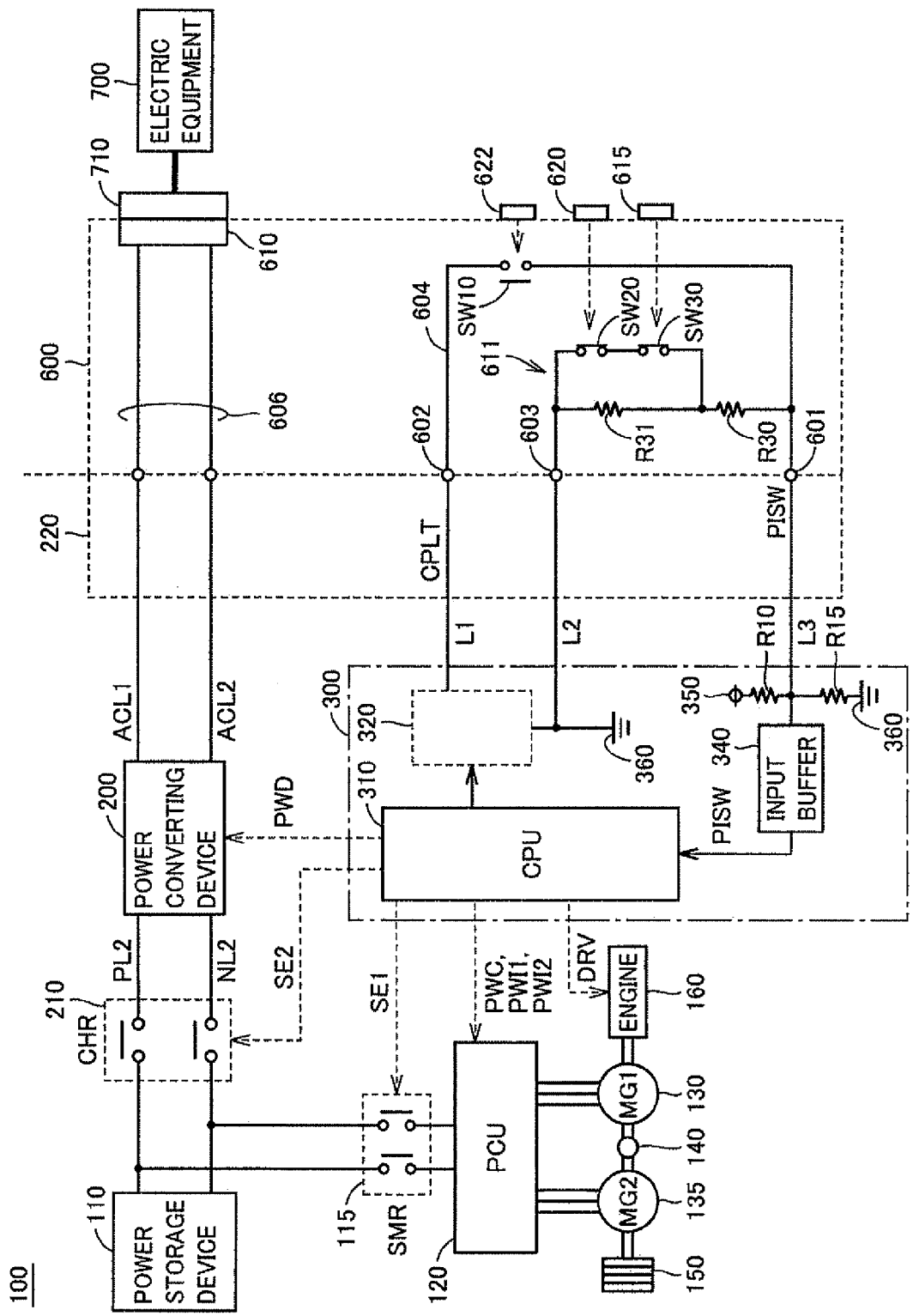
FIG. 10 represents a (third) modified example of the power supply connector shown in FIG. 5.

Further, as shown in FIG. 10, operating portion 622 in addition to operation portion 620 may be further provided, and switch SW10 and switch SW20 may be independent without being in conjunction. In this case, a user operates each of switch SW10 and switch SW20 in a predetermined pattern, so that CPU 310 may identify that power supply connector 600 is attached to inlet 200.

Figure 11:
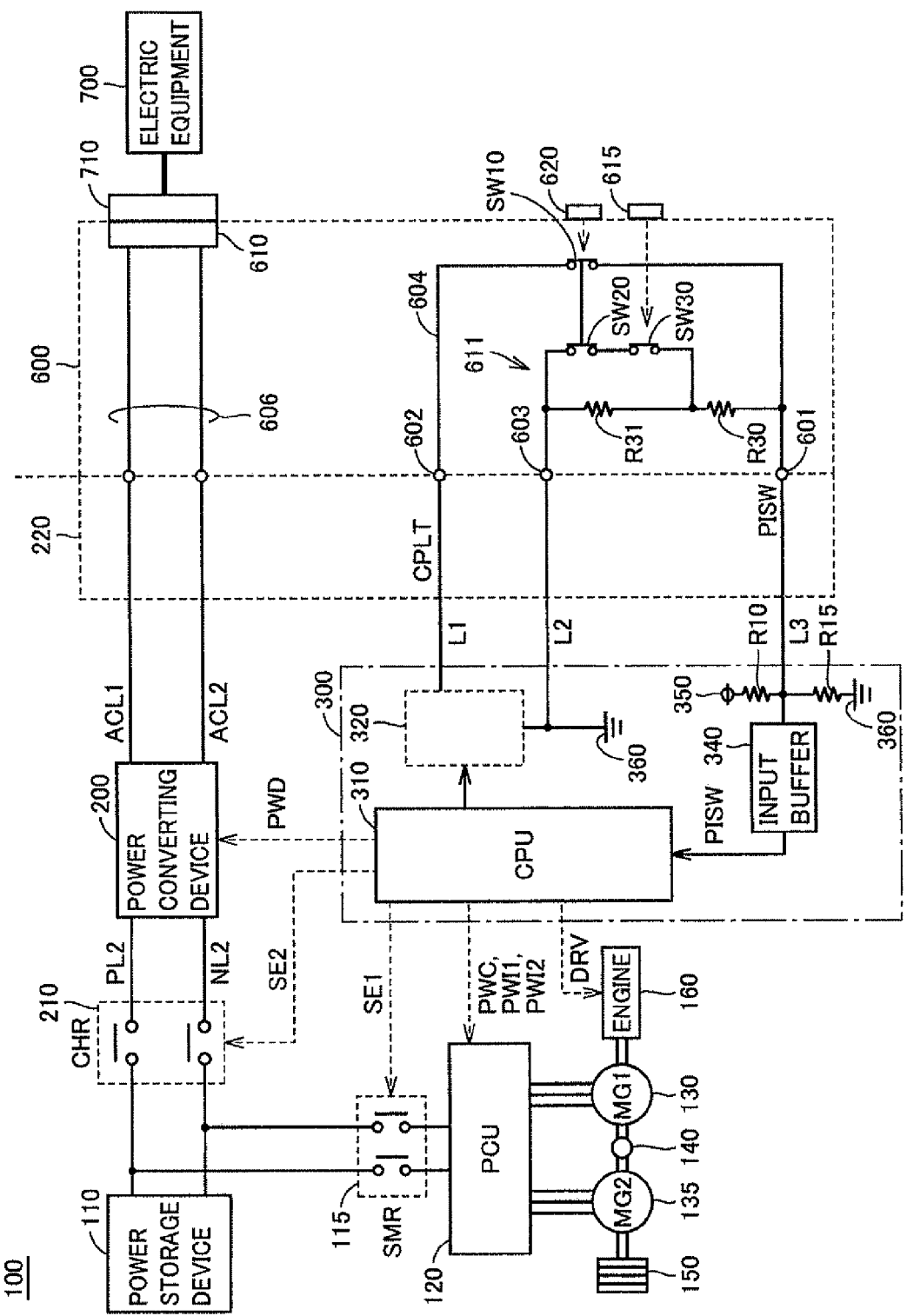
FIG. 11 represents a (fourth) modified example of the power supply connector shown in FIG. 5.

Further, as shown in FIG. 11, instead of setting switch SW10 to be of a normally-opened type, it may be of a normally-closed type similarly to switch SW20. In this case, when a user operates operating portion 620 to open switch SW10 and switch SW20, the electric potential of connection signal line L3 increases from the electric potential Vc2 to the electric potential Vc3, and the electric potential of control pilot line L1 changes (for example, lowers) from the electric potential Vc2 to Vp1. Thereafter, when the switch SW10 is closed, and SW20 is closed, the electric potential of connection signal line L3 is lowered from electric potential Vc3 to electric potential Vc2, and the electric potential of control pilot line L1 changes (for example, increases) from the electric potential Vp1 to Vc2. When the change pattern of such an electric potential, power supply connector 600 may be identified as being attached to inlet 220.

Second Embodiment

Figure 12:
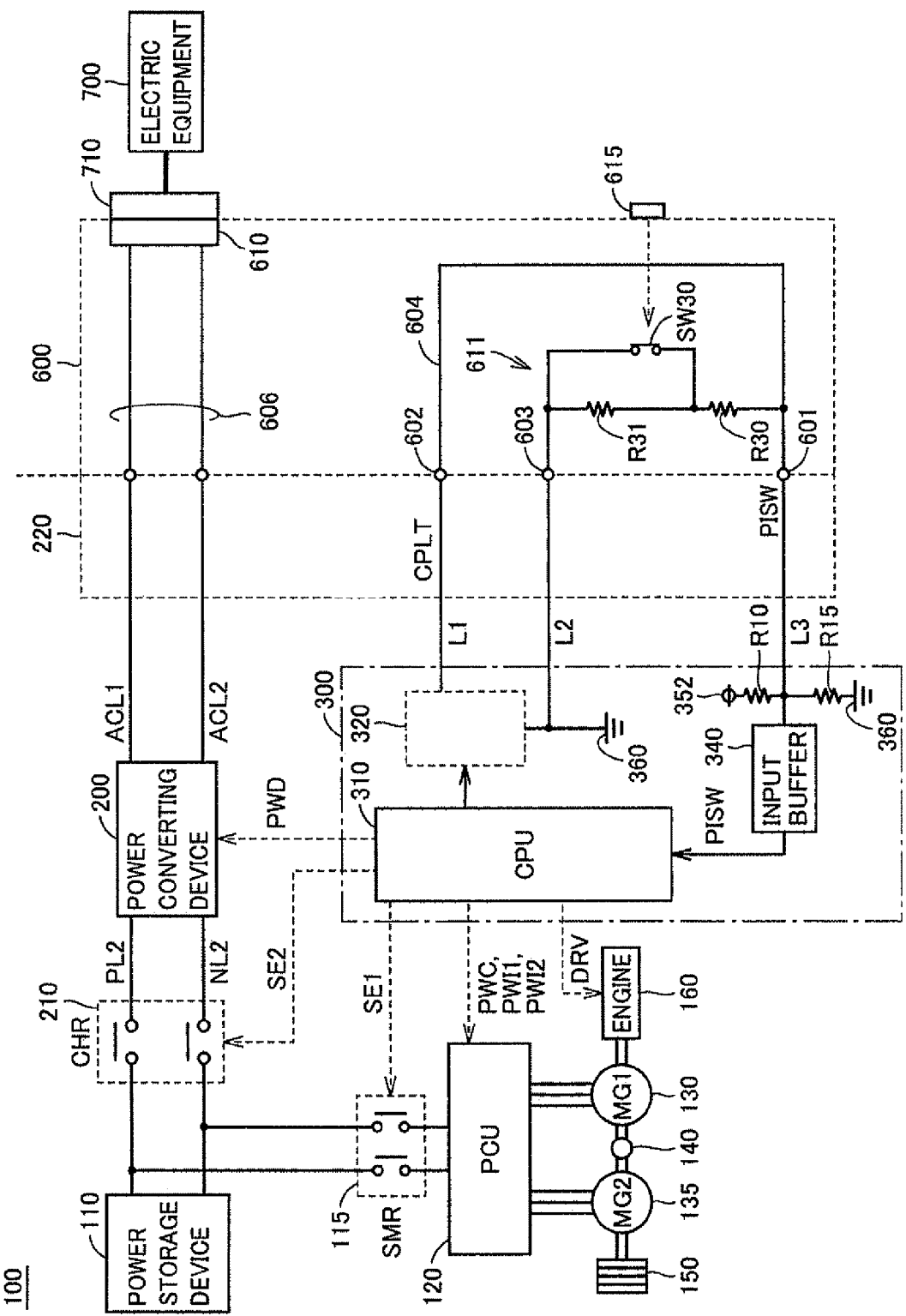
FIG. 12 represents a power supply connector according to the second embodiment.

In the following, the second embodiment will be described. As shown in FIG. 12, in the present embodiment, connection signal line L3 and control pilot line L1 are connected without providing switch SW10. A resistor may be provided between connection signal line L3 and control pilot line L1. In the present embodiment, switch SW20 is also not provided.

Figure 13:
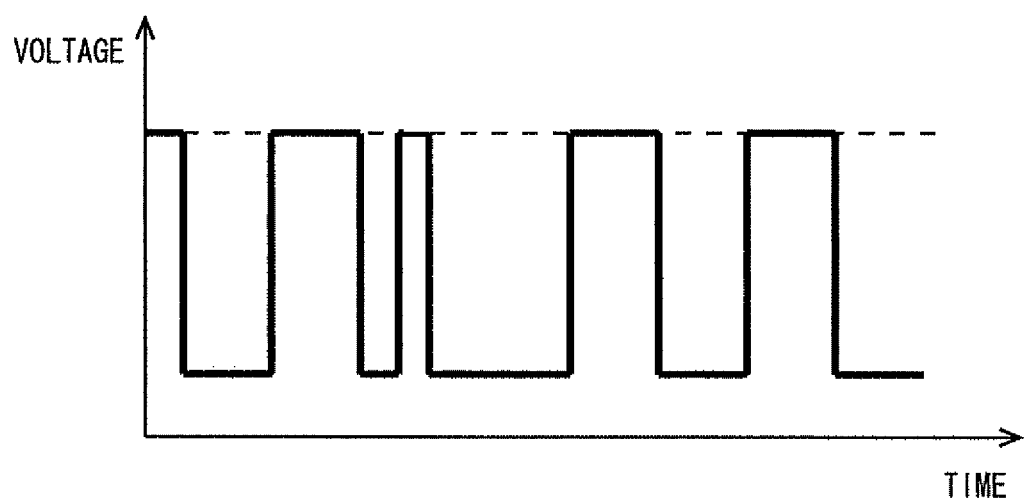
FIG. 13 represents an example of a change pattern of voltage at a power supply node.

Further, in the present embodiment, the electric potential of connection signal line L3 is changed with a predetermined pattern. By way of one example, the power supply node 352 connected to power signal line L3 is changed in its voltage so that the duty ratio is changed in a predetermined pattern, as shown in FIG. 13. Accordingly, the electric potential of connection signal line L3 is changed. In place of changing the duty ratio, the frequency of the waveform of the voltage may be changed. Any analog waveform may be applied.

Figure 14:
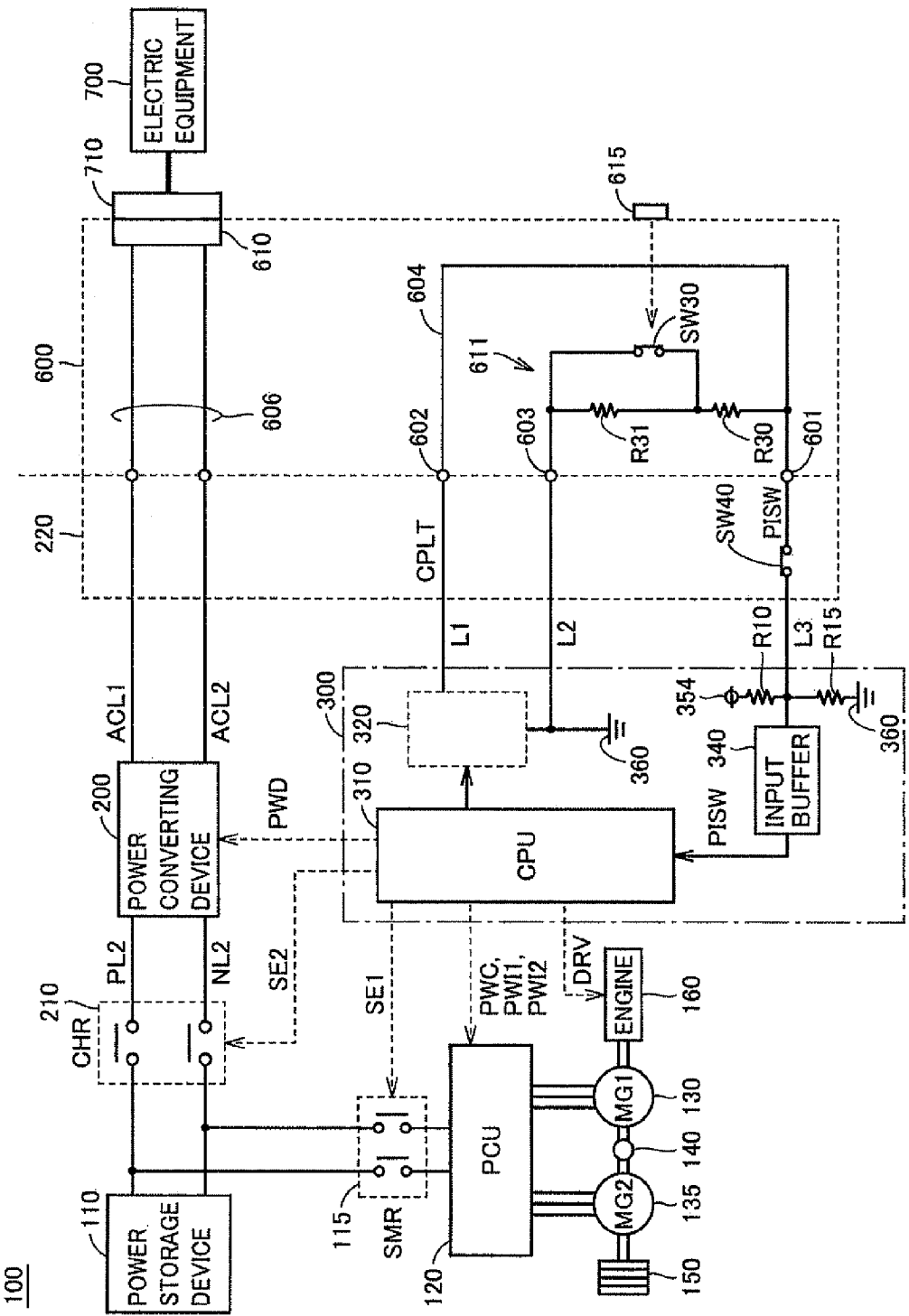
FIG. 14 represents a (first) modified example of the power supply connector shown in FIG. 12.
Figure 15:
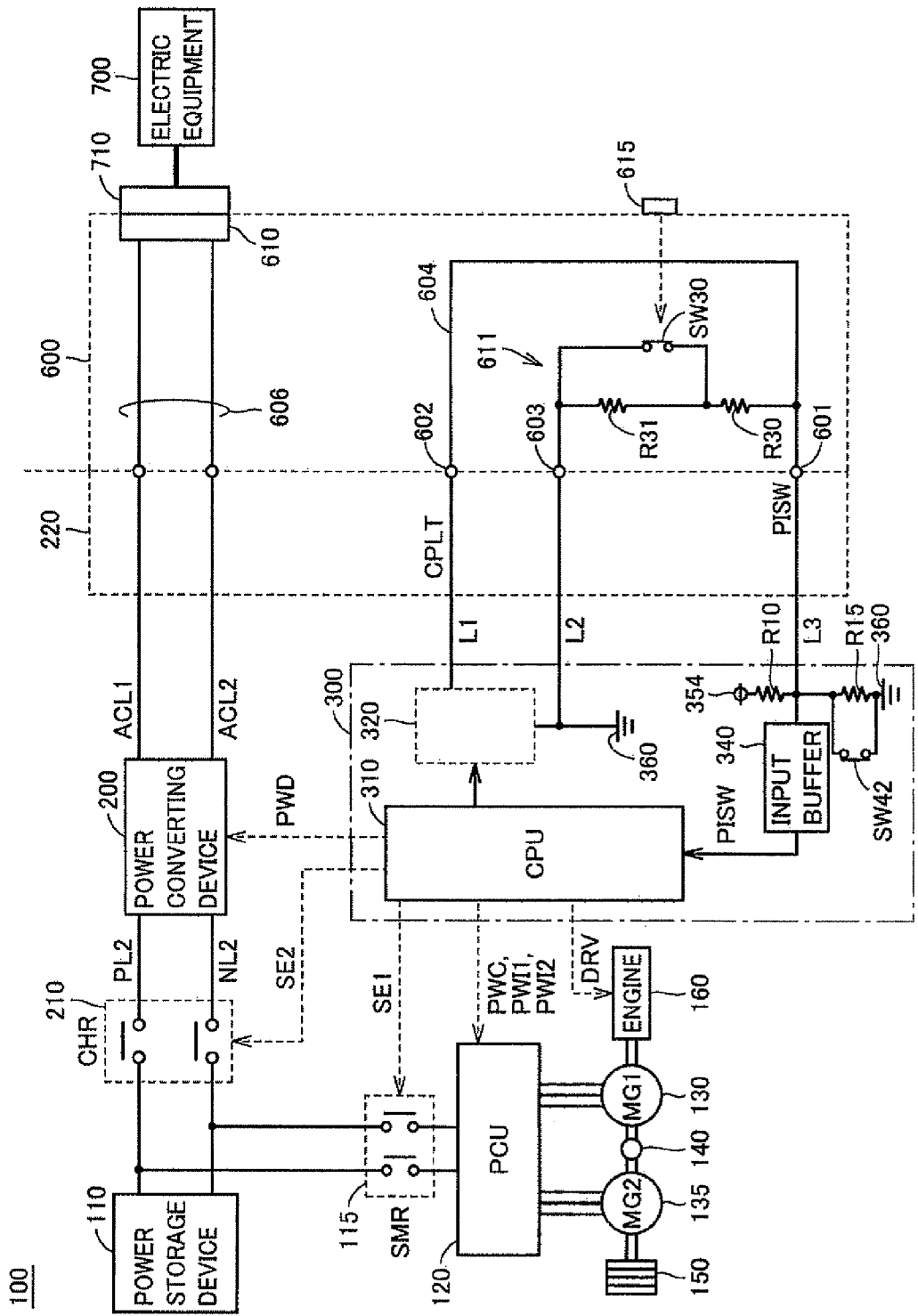
FIG. 15 represents a (second) modified example of the power supply connector shown in FIG. 12.

Instead of changing the output voltage by power supply node 352, a power supply node 354 for applying a predetermined voltage may be provided, and switch SW40 provided on connection signal line L3 may be opened and closed, as shown in FIG. 14. As shown in FIG. 15, switch SW42 provided in parallel with resistor R15 may be opened and closed to change the electric potential of connection signal line L3.

In the present embodiment, CPU 310 identifies that power supply connector 600 is attached when the change pattern of the electric potential of connection signal line L3 and the change pattern of electric potential of control pilot line L1 are the same.

Figure 16:
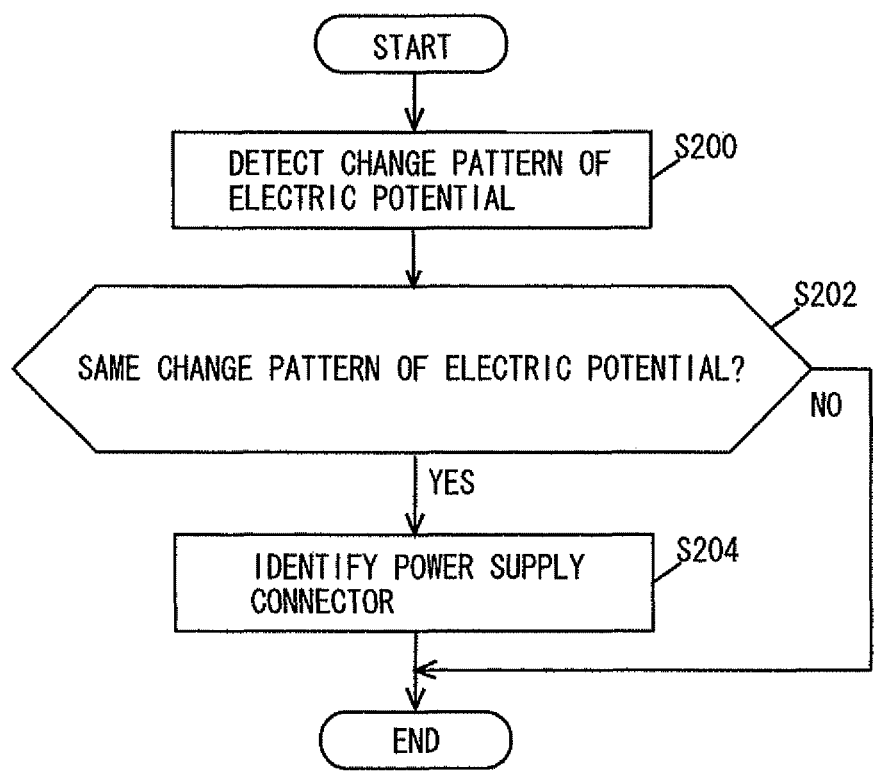
FIG. 16 is a flowchart representing the process executed by an ECU according to the second embodiment.

Referring to FIG. 16, in the present embodiment, the process executed by ECU 300 to identify that power supply connector 600 is attached to inlet 220 will be described. The process described here below will be realized by executing the program stored in advance in CPU 310 at a predetermined cycle. In some of steps, an exclusive hardware (electronic circuit) may be used to realize the process.

In step (hereinafter, abbreviated as S) 200, the change pattern of electric potential of connection signal line L3 and the change pattern of electric potential of control pilot line L1 are detected. When the change pattern of electric potential of connection signal line and the change pattern of electric potential of control pilot line L1 are the same (YES in S202), attachment of the power supply connector 600 is identified in S204.

Figure 17:
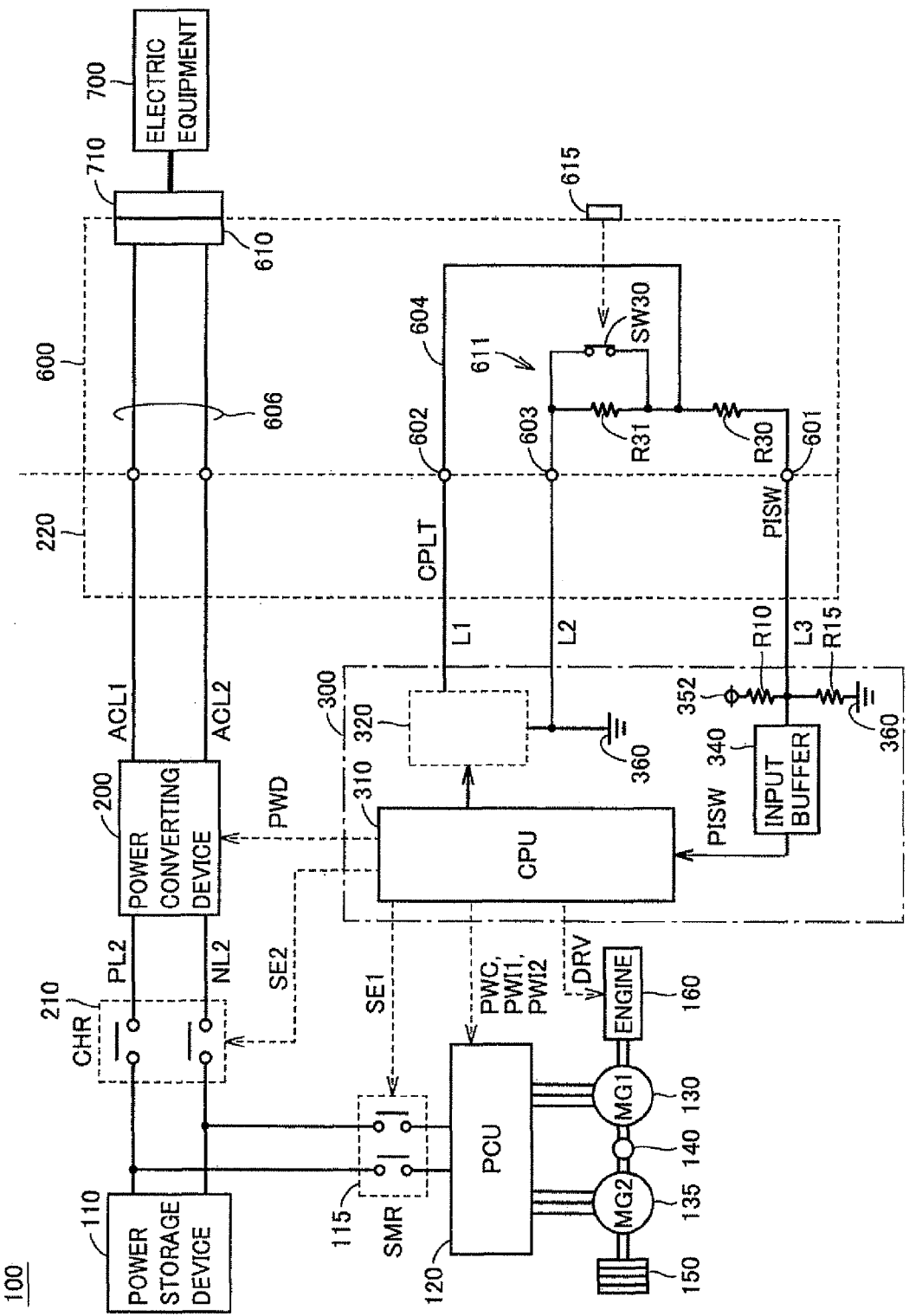
FIG. 17 represents a (third) modified example of the power supply connector shown in FIG. 12.

In the embodiments described above, connection signal line L3 and control pilot line L1 are connected directly. However, as shown in FIG. 17, control pilot line L1 may be connected between resistor R30 and resistor R31. In this case, the resistance may be provided on connection circuit 604.

The embodiments as have been described here are examples in all aspects and should not be interpreted as restrictive. The scope of the present invention is determined not by the description above but by the claims and embraces modifications within the meaning of, and equivalent to, the languages in the claims.

REFERENCE SIGNS LIST 100 vehicle; 110 power storage device; 220 inlet; 300 ECU; 310 CPU; 320 resistance circuit; 330, 340 input buffer; 350, 352, 354 power supply node; 360 ground; 400 power charging cable; 410 charging connector; 411 connection sensing circuit; 415 operating portion; 420 plug; 440 power line; 450 relay; 460 controller; 470 control pilot circuit; 471 electromagnetic coil; 472 oscillation circuit; 473 voltage sensor; 480 power leakage detector; 481 voltage sensor; 482 current sensor; 500 external power supply; 510 outlet; 600 power supply connector; 601 first connection portion; 602 second connection portion; 603 third connection portion; 604 connection circuit; 605 fitting portion; 606 power transmitting portion; 610 output portion; 615, 620, 622 operating portion; 700 electronic equipment; 710 power supply plug; L1 control pilot line; L2 ground line; L3 connection signal line; R1, R2, R10, R15, R25, R26, R30, R31 resistors; SW1, SW2, SW10, SW20, SW30, SW40, SW42 switch.

The invention claimed is:

1. A power supply connector to be attached to a vehicle that is provided with a connection signal line having electric potential modified when a connector of a power charging cable is attached and a control pilot line to which a pilot signal is transmitted from said power charging cable, the power supply connector being configured to output electric power from the vehicle to an external device, the power supply connector comprising:
 a first connection portion configured to be connected to said connection signal line; and
 a second connection portion configured to be connected to said first connection portion and said control pilot line, wherein
  the electric potentials of the first connection portion and the second connection portion change synchronously.

2. The power supply connector according to claim 1, further comprising:
 a first switch provided between said first connection portion and said second connection portion; and
 a second switch provided between said first connection portion and ground.

3. The power supply connector according to claim 2, wherein said first switch is opened when said second switch is closed, and said first switch is closed when said second switch is opened.

4. The power supply connector according to claim 2, wherein said first switch is closed when said second switch is closed, and said first switch is opened when said second switch is opened.

5. The power supply connector according to claim 2, wherein said second switch is of a normally-closed type.

6. The power supply connector according to claim 2, further comprising:
 a third switch connected in series with second switch between said first connection portion and ground, wherein
  said third switch is operated by a user when at least said power supply connector is to be detached from said vehicle.

7. The power supply connector according to claim 1, further comprising a switch provided between said first connection portion and said second connection portion.

8. The power supply connector according to claim 1, further comprising a switch provided between said first connection portion and ground.

9. A power supply connector to be attached to a vehicle that is provided with a connection signal line having electric potential modified when a connector of a power charging cable is attached and a control pilot line to which a pilot signal is transmitted from said power charging cable, the power supply connector being configured to output electric power from the vehicle to an external device, the power supply connector comprising:
 a first connection portion configured to be connected to said connection signal line; and
 a second connection portion configured to be connected to said first connection portion and said control pilot line, wherein
  when attached to the vehicle, a change pattern of the electric potential of said connection signal line and a change pattern of the electric potential of said control pilot line become the same.

10. The power supply connector according to claim 9, further comprising:
 a first switch provided between said first connection portion and said second connection portion; and
 a second switch provided between said first connection portion and ground.

11. The power supply connector according to claim 9, further comprising a switch provided between said first connection portion and said second connection portion.

12. The power supply connector according to claim 9, further comprising a switch provided between said first connection portion and ground.

13. A power supply connector to be attached to a vehicle that is provided with a connection signal line having electric potential modified when a connector of a power charging cable is attached and a control pilot line to which a pilot signal is transmitted from said power charging cable, the power supply connector being configured to output electric power from the vehicle to an external device, the power supply connector comprising:
 a first connection portion configured to be connected to said connection signal line;
 a second connection portion configured to be connected to said first connection portion and said control pilot line; and
 a switch provided between said first connection portion and said second connection portion.

14. A power supply connector to be attached to a vehicle that is provided with a connection signal line having electric potential modified when a connector of a power charging cable is attached and a control pilot line to which a pilot signal is transmitted from said power charging cable, the power supply connector being configured to output electric power from the vehicle to an external device, the power supply connector comprising:
 a first connection portion configured to be connected to said connection signal line;
 a second connection portion configured to be connected to said first connection portion and said control pilot line; and
 a switch provided between said first connection portion and ground.

15. A vehicle, comprising:
 a connection signal line having electric potential modified when a connector of a power charging cable is attached;
 a control pilot line to which a pilot signal is transmitted from said power charging cable; and
 an identifying device which identifies that a power supply connector is attached in accordance with a change pattern of electric potential of said connection signal line and a change pattern of electric potential of said control pilot line, the power supply connector being configured to output electric power from the vehicle to an external device.

16. The vehicle according to claim 15, wherein said power supply connector includes:
 a first connection portion configured to be connected to said connection signal line; and
 a second connection portion configured to be connected to said first connection portion and said control pilot line, and
 the vehicle further comprises:
  a changing device which changes the electric potential of said connection signal line.

17. The vehicle according to claim 16, wherein said changing device changes the electric potential of said connection signal line in a predetermined pattern.

18. A method for identifying a power supply connector to be attached to a vehicle that is provided with a connection signal line having electric potential modified when a connector of a power charging cable is attached and a control pilot line to which a pilot signal is transmitted from said power charging cable, the power supply connector being configured to output electric power from the vehicle to an external device, the method for identifying the power supply connector comprising the steps of:

detecting a change pattern of electric potential of said connection signal line;

detecting a change pattern of electric potential of said control pilot line; and identifying that the power supply connector is attached in accordance with a change pattern of electric potential of said connection signal line and a change pattern of electric potential of said control pilot line.

\* \* \* \* \*